United States Patent
Lampazzi et al.

(10) Patent No.: US 11,186,384 B2
(45) Date of Patent: Nov. 30, 2021

(54) ADAPTIVE FLIGHT DISPLAY FOR AUTONOMOUS AIRCRAFT OPERATIONS

(71) Applicant: LOCKHEED MARTIN CORPORATION, Bethesda, MD (US)

(72) Inventors: Margaret M. Lampazzi, Oxford, CT (US); George Nicholas Loussides, West Haven, CT (US); Igor Cherepinsky, Sandy Hook, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 341 days.

(21) Appl. No.: 16/575,497

(22) Filed: Sep. 19, 2019

(65) Prior Publication Data

US 2021/0086911 A1  Mar. 25, 2021

(51) Int. Cl.
*B64D 45/00* (2006.01)
*G05D 1/00* (2006.01)
*G08G 5/00* (2006.01)

(52) U.S. Cl.
CPC ........... *B64D 45/00* (2013.01); *G05D 1/0061* (2013.01); *G05D 1/0088* (2013.01); *G08G 5/0017* (2013.01); *G08G 5/0047* (2013.01)

(58) Field of Classification Search
CPC ...... B64D 45/00; B64D 43/00; G05D 1/0088; G05D 1/0061; G08G 5/0017; G08G 5/0047; G08G 5/0021; G08G 5/0052; B64C 27/04; G01C 23/00
See application file for complete search history.

(56) References Cited

U.S. PATENT DOCUMENTS

| | | | |
|---|---|---|---|
| 9,405,005 B1* | 8/2016 | Arteaga | G01S 13/933 |
| 9,488,979 B1* | 11/2016 | Chambers | B64C 39/024 |
| 9,547,929 B1 | 1/2017 | Whitlow et al. | |
| 9,847,034 B1* | 12/2017 | Plawecki | G08G 5/0039 |
| 10,173,785 B2 | 1/2019 | Leachman et al. | |
| 10,302,759 B1* | 5/2019 | Arteaga | G08G 5/0082 |
| 2016/0292403 A1* | 10/2016 | Gong | G08G 5/006 |
| 2017/0277185 A1* | 9/2017 | Duda | B64D 43/00 |
| 2020/0241525 A1* | 7/2020 | Harbour | A61B 5/6803 |

* cited by examiner

*Primary Examiner* — Richard M Camby
(74) *Attorney, Agent, or Firm* — Foley & Lardner LLP

(57) ABSTRACT

A technique relates to adaptive flight display. The technique includes rendering a first flight instrument display during autonomous flight operation of an aircraft, the first flight instrument display comprising autonomous mode information; determining, by a processor, that a trigger is met to transition from the first flight instrument display for the autonomous flight operation to a second flight instrument display for providing an increased perception of aircraft operating parameters for at least one of increased human awareness and human operation of the aircraft, the trigger being associated with a requirement for human intervention; and in response to the trigger being met, rendering the second flight instrument display for the human operation of the aircraft, the second flight instrument display comprising additional information.

20 Claims, 9 Drawing Sheets

800

RENDER A FIRST FLIGHT INSTRUMENT DISPLAY DURING AUTONOMOUS FLIGHT OPERATION OF AN AIRCRAFT, THE FIRST FLIGHT INSTRUMENT DISPLAY COMPRISING AUTONOMOUS MODE INFORMATION 802

↓

MONITOR THE AUTONOMOUS FLIGHT OPERATION FOR A TRIGGER 804

↓

DETERMINE, BY A PROCESSOR, THAT A TRIGGER IS MET TO TRANSITION FROM THE FIRST FLIGHT INSTRUMENT DISPLAY FOR THE AUTONOMOUS FLIGHT OPERATION TO A SECOND FLIGHT INSTRUMENT DISPLAY FOR HUMAN OPERATION OF THE AIRCRAFT, THE TRIGGER BEING ASSOCIATED WITH A REQUIREMENT FOR HUMAN INTERVENTION 806

↓

IN RESPONSE TO THE TRIGGER BEING MET, RENDER THE SECOND FLIGHT INSTRUMENT DISPLAY FOR THE HUMAN OPERATION OF THE AIRCRAFT, THE SECOND FLIGHT INSTRUMENT DISPLAY COMPRISING ADDITIONAL INFORMATION 808

*FIG. 8*

ADAPTIVE FLIGHT DISPLAY FOR AUTONOMOUS AIRCRAFT OPERATIONS

BACKGROUND

Exemplary embodiments relate to the art of rotary or fixed wing aircraft, and more particularly, to adaptive flight displays for autonomous operations.

BRIEF DESCRIPTION

According to one or more embodiments, a method for adaptive flight display is provided. The method includes rendering a first flight instrument display during autonomous flight operation of an aircraft, the first flight instrument display comprising autonomous mode information; determining, by a processor, that a trigger is met to transition from the first flight instrument display for the autonomous flight operation to a second flight instrument display for providing an increased perception of aircraft operating parameters for at least one of increased human awareness and human operation of the aircraft, the trigger being associated with a requirement for human intervention; and in response to the trigger being met, rendering the second flight instrument display for the human operation of the aircraft, the second flight instrument display comprising additional information.

In addition to one or more of the features described above or below, or as an alternative, further embodiments could include wherein the autonomous mode information is associated with monitoring the autonomous flight operation of the aircraft.

In addition to one or more of the features described above or below, or as an alternative, further embodiments could include wherein the autonomous mode information is void of detailed parameters utilized for human operation of the aircraft.

In addition to one or more of the features described above or below, or as an alternative, further embodiments could include wherein the additional information comprises detailed parameters for the human operation of the aircraft.

In addition to one or more of the features described above or below, or as an alternative, further embodiments could include wherein the second flight instrument display comprises the detailed parameters and at least a portion of the autonomous mode information associated with monitoring the autonomous flight operation of the aircraft.

In addition to one or more of the features described above or below, or as an alternative, further embodiments could include wherein the second flight instrument display comprises at least one parameter for the human operation of the aircraft superimposed on the autonomous mode information associated with monitoring the autonomous flight operation of the aircraft.

In addition to one or more of the features described above or below, or as an alternative, further embodiments could include wherein the trigger comprises receiving an indication of a condition internal to the aircraft.

In addition to one or more of the features described above or below, or as an alternative, further embodiments could include wherein the trigger comprises receiving an indication of a condition external to the aircraft.

In addition to one or more of the features described above or below, or as an alternative, further embodiments could include wherein the trigger comprises receiving an indication that a portion of a flight path is approaching which requires the human intervention.

In addition to one or more of the features described above or below, or as an alternative, further embodiments could include wherein the trigger comprises receiving an indication that at least one user control has been adjusted.

According to one or more embodiments, a system for adaptive flight display is provided. The system includes a processor and memory coupled to the processor and comprising computer-executable instructions that, when executed by the processor, cause the processor to perform operations. The operations include rendering a first flight instrument display during autonomous flight operation of an aircraft, the first flight instrument display comprising autonomous mode information; determining, by a processor, that a trigger is met to transition from the first flight instrument display for the autonomous flight operation to a second flight instrument display for providing an increased perception of aircraft operating parameters for at least one of increased human awareness and human operation of the aircraft, the trigger being associated with a requirement for human intervention; and in response to the trigger being met, rendering the second flight instrument display for the human operation of the aircraft, the second flight instrument display comprising additional information.

BRIEF DESCRIPTION OF THE DRAWINGS

The following descriptions should not be considered limiting in any way. With reference to the accompanying drawings, like elements are numbered alike:

FIG. 8 depicts a flow chart of a method for adaptive flight display in accordance with an embodiment.

DETAILED DESCRIPTION

A detailed description of one or more embodiments of the disclosed apparatuses are presented herein by way of exemplification and not limitation with reference to the Figures.

Figure 1:
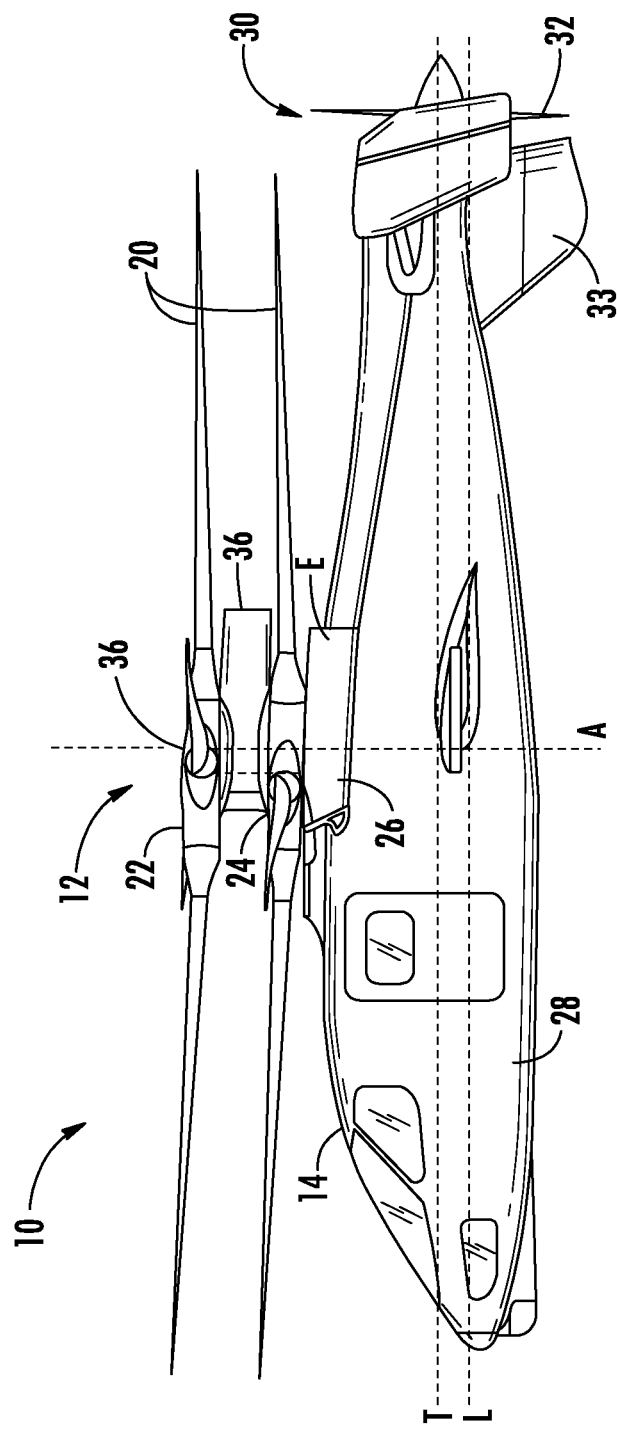
FIG. 1 depicts a rotary wing aircraft in accordance with an exemplary embodiment.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis L. Although a particular aircraft configuration is illustrated in this non-limiting embodiment, other rotary-wing aircraft or fixed-wing aircraft will also benefit from embodiments of the invention.

The dual, counter-rotating, coaxial rotor system 12 includes an upper rotor system and a lower rotor system. Rotor system 12 includes a plurality of rotor blades 20 mounted to a rotor hub 22, 24 for rotation about rotor axis of rotation A. A plurality of the main rotor blades 20 project substantially radially outward from the hubs 22, 24. Any number of blades 20 may be used with the rotor system 12. The rotor system 12 includes a rotor hub fairing 36 generally located between and around the upper and lower rotor systems such that the rotor hubs 22, 24 are at least partially contained therein. The rotor hub fairing 36 provides drag reduction.

A main gearbox 26 may be located above the aircraft cabin 28 and drives the rotor system 12. The translational thrust system 30 may be driven by the same main gearbox 26 which drives the rotor system 12. The main gearbox 26 is driven by one or more engines (illustrated schematically as E).

The translational thrust system 30 may be mounted to the rear of the airframe 14 with a translational thrust axis, T, oriented substantially horizontal and parallel to the aircraft longitudinal axis L to provide thrust for high-speed flight. The translational thrust system 30 includes a pusher propeller 32 mounted at an aerodynamic tail fairing 33. The translational thrust axis T, corresponds to the axis of rotation of propeller 32. Although a tail mounted translational thrust system 30 is disclosed in this illustrated non-limiting embodiment, it should be understood that any such system or other translational thrust systems may alternatively or additionally be utilized.

Figure 2:
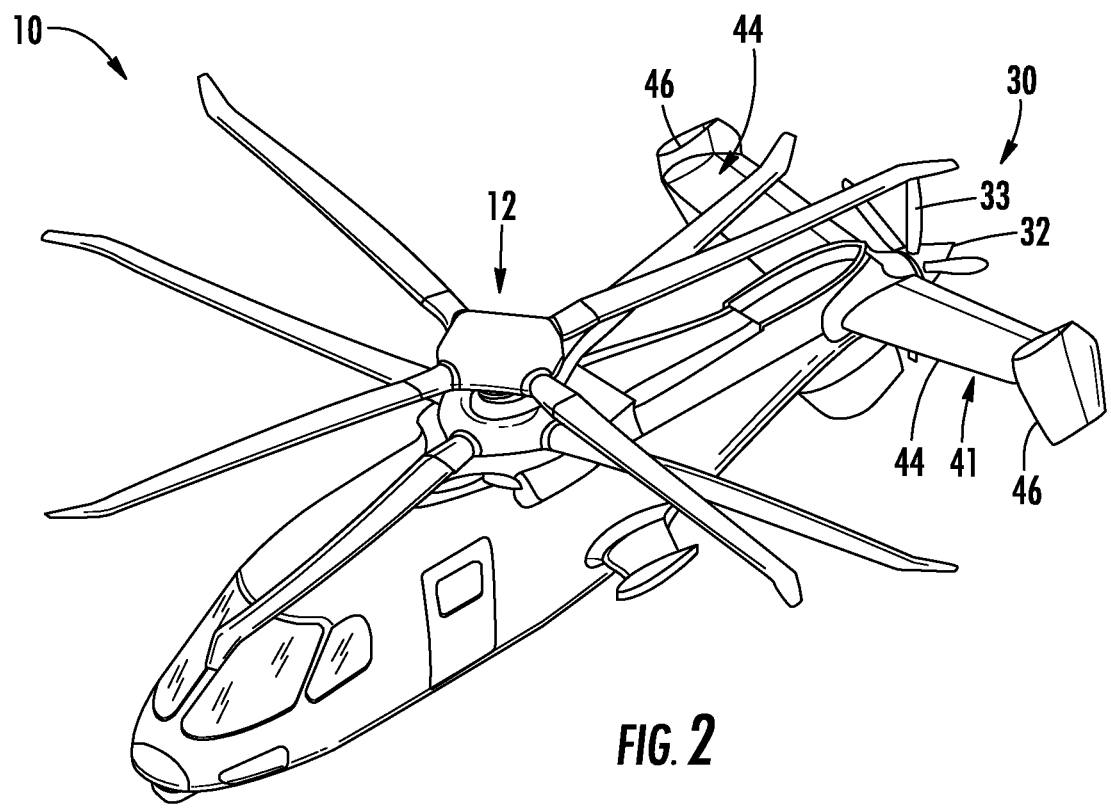
FIG. 2 depicts a perspective view of a main rotor system in accordance with an embodiment.

In the example of FIGS. 1 and 2, the auxiliary propulsor 32 includes a plurality of propeller blades 33 and is positioned at a tail section 41 of the aircraft 10. The tail section 41 includes active elevators 44 and active rudders 46 as controllable surfaces, as best seen in FIG. 2. During flight regimes, aircraft pitch attitude and longitudinal velocity demands (i.e., speed) can change independently. Exemplary embodiments control both the main rotor system 12 and the translational thrust system 30 to support a range of aircraft pitch attitudes over a range of aircraft airspeeds.

Figure 3:
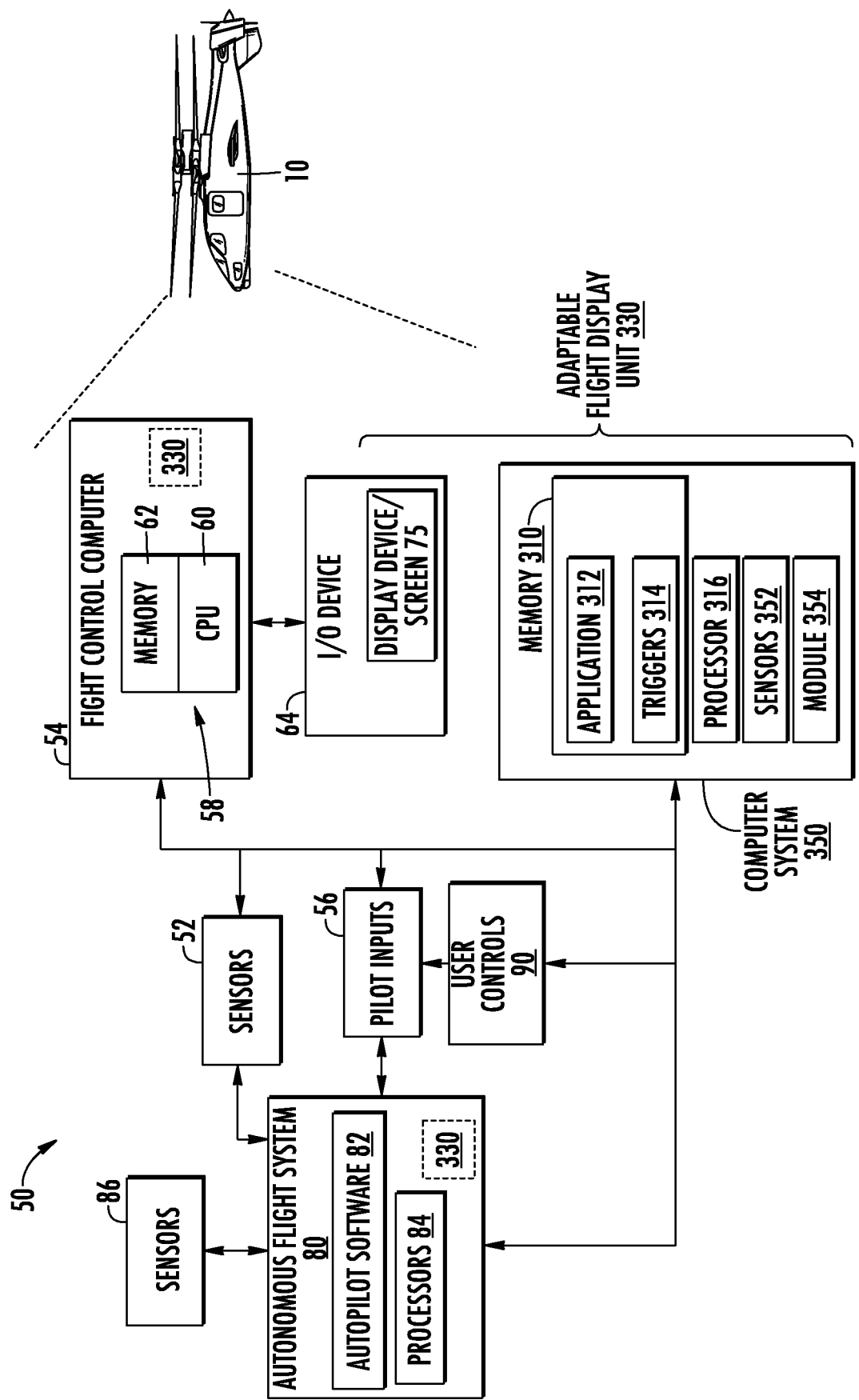
FIG. 3 depicts a schematic diagram of a control system in accordance with an embodiment.

FIG. 3 illustrates an example of a control system 50 of an aircraft, such as aircraft 10. In an embodiment, the flight control system 50 is a fly-by-wire (FBW) control system. In a FBW control system, there is no direct mechanical coupling between a pilot's controls (depicted as user controls 90) and movable components such as rotor blade assemblies 20 or propeller blades 33 of the aircraft 10 of FIG. 1. Instead of using mechanical linkages, a FBW control system 50 includes a plurality of sensors 52 which can sense the position of controlled elements and generate electrical signals proportional to the sensed position. The sensors 52 may also be used directly and indirectly to provide a variety of aircraft state data to a flight controller (FCC) 54 as well as to an autonomous/autopilot flight system 80. Examples of flight conditions of the aircraft measured by the sensors 52, include, but are not limited to, main rotor rotational speed, rotor torque, rotor blade pitch, propeller rotational speed, propeller torque, airspeed, and thrust for example.

Pilot commands or inputs 56 from pilot inceptors (depicted as user controls 90) are received by the flight controller 54 as a commanded change to one or more components of the aircraft, such as the main rotor system or the translational thrust system for example. Pilot inputs 56 can be in the form of stick commands and/or beeper commands to set and incrementally adjust reference values for controllers. The pilot inputs 56 need not be directly provided by a human pilot, but may be driven by an automatic pilot, a remote control, a navigation-based control, or one or more control loops configured to produce one or more values used to pilot the aircraft 10. As an example of the pilot inputs 56 being driven by the automatic pilot, the autonomous/autopilot flight system 80 is configured to provide commands for controlling the aircraft 10. The autonomous/autopilot flight system 80 can include autopilot software 82 executed by processors 84, and the autopilot software generates commands or input for flying the aircraft 10 by applying applies models and control laws in response to data received from sensors 52 about the state of the aircraft 10 and/or sensors 86 about the external environment in which the aircraft 10 is flying.

In response to inputs from the sensors 52 and pilot inputs 56, the FCC 54 transmits signals to various subsystems of the aircraft 10, such as the main rotor system 12 and the translational thrust system 30. In an embodiment, rather than simply passing pilot inputs 56 to various subsystems, a processing system 58 operably coupled to or integrated with the FCC 54 applies models and control laws to augment the flight control actuator commands provided to one or more servos or actuators of the aircraft 10.

The processing system 58 includes processing circuitry 60, memory 62, and an interface with at least one input/output device 64. The processing circuitry 60 can be any type or combination of computer processors, such as a microprocessor, microcontroller, digital signal processor, application specific integrated circuit, programmable logic device, and/or field programmable gate array, and is generally referred to as central processing unit (CPU). The memory 62 can include volatile and non-volatile memory, such as random access memory (RAM), read only memory (ROM), or other electronic, optical, magnetic, or any other computer readable storage medium onto which data and control logic as described herein are stored. Therefore, the memory 62 is a tangible storage medium where instructions executable by the processing circuitry 60 are embodied in a non-transitory form.

The I/O device 64 may be used to present information to, and/or receive input selections from, a user (e.g., a pilot). The at least one I/O device 64 may include a display device or screen 75, audio speakers, a graphical user interface (GUI), etc. It is to be appreciated that the control system 50 is intended as an example only illustrative. In some embodiments, additional components or entities not shown in FIG. 3 may be included. In some embodiments, one or more of the components or entities may be optional. In some embodiments, the components or entities of the control system 50 may be arranged or configured differently from what is shown in FIG. 3.

The hallmark of any aircraft cockpit is the primary flight display (PFD), and the PFD has not changed much since inception. What began as a 6-pack of mechanical gauges still exists today in a similar yet digital format. Digital representations of primary flight information exists in modern aircraft in both tape and dial formats as well as condensed versions in a head-up display (HUD) and in helmet-mounted display (HMD). The PFD 6-pack layout is based on the notion of simplifying pilot scan and consolidating all the primary information into one location, such as, for example, airspeed on left, barometric altitude on right, attitude information in the center, etc. The PFD concept is designed to support hands on flight with a pilot manipulating control sticks such as changing heading, pitch, roll, etc.; the PFD has evolved with modern autopilots to include mode awareness cues and/or flight director settings, for example, flight director "bugs".

Autonomy via the autonomous flight system 80 changes the task of the pilot. For example, the pilot is no longer "handling" the aircraft or controlling the aircraft 10 via user controls 90 in terms of speed, heading, bank angle, altitude, etc., and therefore, the PFD no longer requires the same level or even type of flight information as known today with the autonomous flight system 80. Moreover, autonomy changes the information elements that the pilot needs (to view) and eliminates the need for detailed primary flight display (PFD) because as the autonomy manages this information. However, in the case where the autonomy fails and/or is not able to complete a task, the pilot may need to take over manually and fly or simply get on the inceptors to alter the path. If this were the case, the pilot may need primary flight information as provided according to embodiments. However, there is no "PFD" in the state-of-the-art that can adapt to this change in task.

According to embodiments, an adaptable flight display unit 330 for use with autonomous operation of the aircraft 10 is provided, and the adaptable flight display unit 330 via display device 75 displays the primary flight elements required to keep the pilot in the loop during autonomous operation. Even though the autonomy of autonomous flight system 80 is managing the planned path of the aircraft 10 and flight of that path, the pilot still needs information to be informed of what is occurring in the aircraft 10 in order to support a control shift should the need to take over control of the aircraft 10. Thus, this adaptable flight display unit 330 generates a set of flight instruments that relay sufficient information to the human pilot during autonomous flight and morphs into more detailed flight symbology as needed on display device 75, according to embodiments. This solution of the adaptive flight display unit 330 addresses the unique pilot tasks when interacting with an autonomous flight system, such as autonomous flight system 80.

Referring to FIG. 3, the adaptable flight display unit 330 includes a computer system 350 and display device 75. The computer system 350 includes memory 310 and one or more processors 316 coupled to memory 310. The processors 316 are configured to execute computer readable/executable instructions in the memory 310. The memory 310 includes one or more software applications 312 comprising computer readable/executable instructions. The software application 312 is configured to generate and/or cause the generation of a flight instrument PFD needed for manual control of the aircraft 10 by a human pilot based on determining that human intervention is presently needed and/or that human intervention will be needed. FIG. 3 illustrates the flight control computer 54 and adaptable flight display unit 330 are separate. In some examples, the adaptable flight display unit 330 may be integrated into the flight control computer 54. Also, in some examples, the adaptable flight display unit 330 may be integrated into the autonomous flight system 80.

Figure 4:
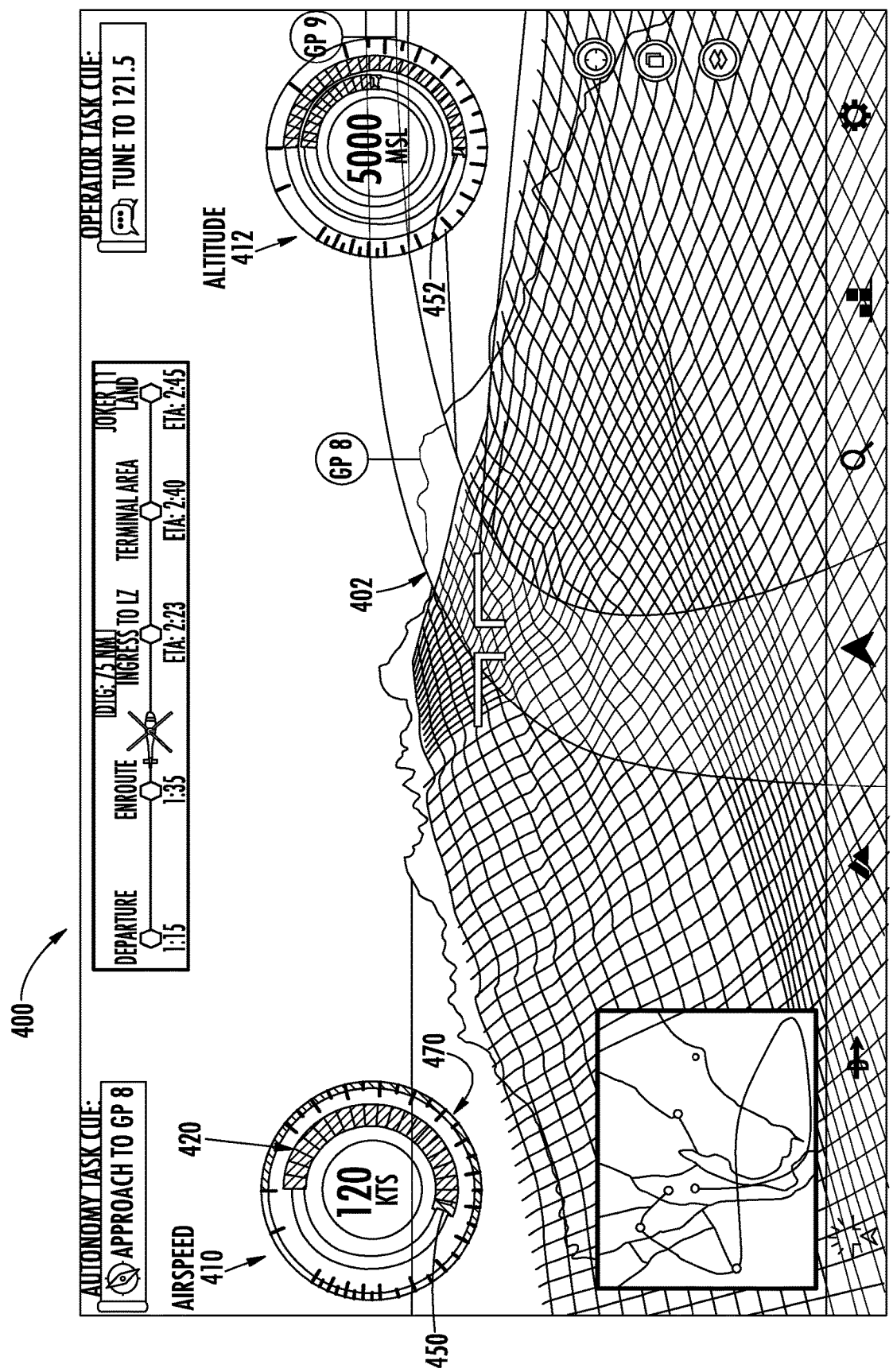
FIG. 4 depicts an example adaptive flight display with autonomy in full control in accordance with an embodiment.

FIG. 4 depicts an example adaptive flight display 400 on display device 75 as generated by and/or caused to be generated by the adaptable flight display unit 330 according to embodiments. As illustrated in FIG. 4, the adaptive flight display 400 is for autonomous operations while the autonomous flight system 80 controls the aircraft 10. The adaptable flight display unit 330 generates the adaptive flight display 400 with example autonomy managing flight path 402 along with flight parameters such as airspeed instrument display 410, altitude instrument display 412, heading, etc., because the pilot still needs to view the current airspeed, altitude, etc. Although two instrument displays are illustrated in scenarios for example purposes, embodiments are not meant to be limited to only the airspeed instrument display 410 and altitude instrument display 412. To mitigate trust issues with autonomy provided by the autonomous flight system 80, the primary flight parameters are not completely removed at this stage by adaptable flight display unit 330. The adaptive flight display 400 illustrates a maximum speed indicator 450 and a maximum altitude indicator 452 for the autonomous flight system 80. The current airspeed indicator 420 for autonomous operations by the autonomous flight system 80 is shown as 120 knots. The current altitude for autonomous operations by the autonomous flight system 80 is shown as 5000 mean sea level (MSL). The autonomous version dials such as the airspeed instrument display 410 and altitude instrument display 412 illustrated in FIG. 4 do not display precision information (such as, for example, tick marks, continuous airspeed markings, and/or altitude markings which are not needed in) but provide sufficient information to cue the pilot to rate of motion (e.g., increasing speed, decreasing speed, increasing altitude, decreasing altitude) during autonomous operations. This is more of an abstract perception of altitude and airspeed. However, when the human pilot is operating the user controls 90, he/she needs more precision information (tick marks, speed markings, altitude markings, etc.,) to modulate control of that parameter. Although FIGS. 4, 5, and 6 may show dials next to each other, this positioning is just for illustration purposes. It is understood that altitude would be on the right, and airspeed is on left.

Figure 5:
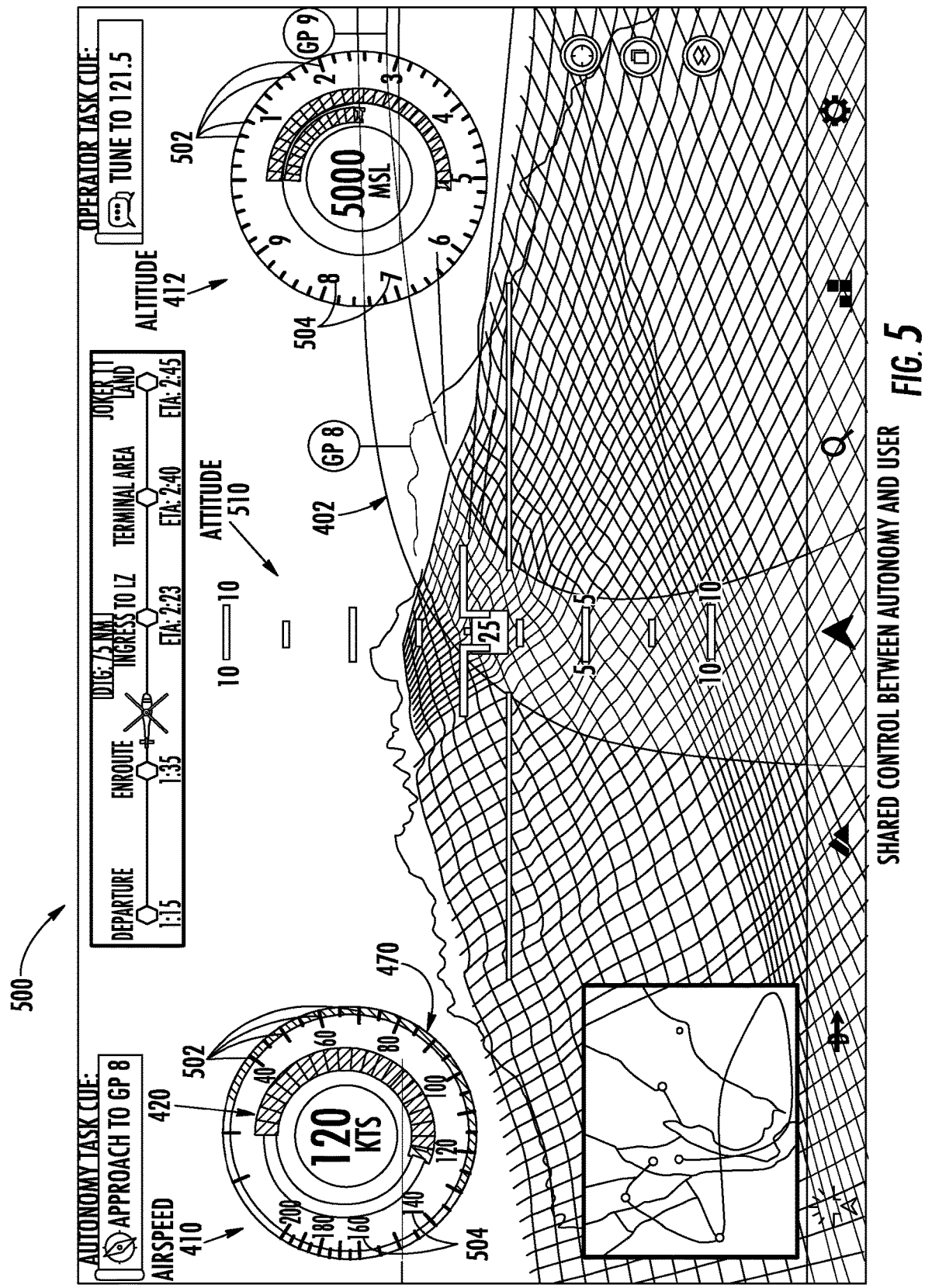
FIG. 5 depicts an example adaptive flight display with shared control between autonomy and user in accordance with an embodiment.

As a transition to another display, FIG. 5 depicts example adaptive flight display 500 on display device 75 as generated by and/or caused to be generated by the adaptable flight display unit 330 according to embodiments. The adaptive flight display 500 is generated by adaptable flight display unit 330 for shared control between the autonomy of the autonomous flight system 80 controls the aircraft 10 and the human pilot (user) using user controls 90. FIG. 5 is an example of autonomy managing flight path (and therefore flight parameters) by the autonomous flight system 80, and human intervention is needed and/or has occurred, which means that the human pilot is in the loop via the flight control inceptors and/or tablet/display (depicted as user controls 90) and/or needs to enter the loop for control of some aspect of the aircraft 10. Pilot "in the loop" is defined as getting on the controls in some manner, such as, for example, on the flight control grips and/or display/tablet device in which the human pilot is manipulating or interacting with primary flight parameters in some regard (whether manipulating pitch of aircraft through the flight control or adjusting airspeed through the tablet/display device). Human intervention and/or a requirement for human intervention is automatically sensed by the application 312 of the adaptable flight display unit 330 and/or the autonomous flight system 80. Because the adaptable flight display unit 330 and/or the autonomous flight system 80 detected human intervention, the adaptable flight display unit 330 is configured to adapt primary flight parameters to the user's needs. FIG. 5 illustrates an example of this adaptable concept again using the airspeed instrument display 410 and altitude instrument display 412. As seen in FIG. 5, the adaptable flight display unit 330 is configured to transition the airspeed dial in airspeed instrument display 410 and altitude dial in altitude instrument display 412 to include additional information such as tick marks 502, digits 504, etc., that a human would need to modulate these parameters. The tick marks 502, digits 504, etc., are not needed by the human pilot when the aircraft 10 is operated in (full) autonomy by autonomous flight system 80 as depicted in FIG. 4, and operated in autonomy means the human pilot is no longer "handling" the aircraft or controlling the aircraft 10 via user controls 90 in terms of speed, heading, bank angle, altitude, etc. For example, the intended autonomy "ranges" can be depicted as color coded arc portions on each dial, such as by airspeed range 470. The airspeed display 410 (airspeed dial) shows an outer color circle on the very outer edge of the right side of the dial (extending to about 185 degrees), and this airspeed range 470 is to indicate the overall speed/operating range for that parameter. Particularly, this is the total range (speed) in which the autonomy will fly and execute its maneuvers and the autonomy will not reach speeds outside of this range.

Further, as seen in FIG. 5, the adaptable flight display unit 330 also displays the attitude instrument display 510 because the attitude instrument display 510 was not needed during autonomous operation but is now needed for human intervention by the pilot. Also, the attitude instrument display 510 displays a horizon line 520 and heading digits, all of which provide more flight information to assist the human her/his inputs. Additionally, the dials such as the airspeed instrument display 410 and altitude instrument display 412 have increased in size in FIG. 5. As can be recognized, the adaptable flight display unit 330 is configured to transition display on the display screen 75 from adaptive flight display 400 for autonomous operations while the autonomous flight system 80 controls the aircraft 10 to adaptive flight display 500 for shared control of the aircraft 10 by both the autonomous flight system 80 and the human pilot (user) using user controls 90. It should be appreciated that the adaptive flight display 500 provides an increased perception of aircraft operating parameters for at least one of increased human awareness and/or human operation by the pilot of the aircraft 10.

Figure 7:
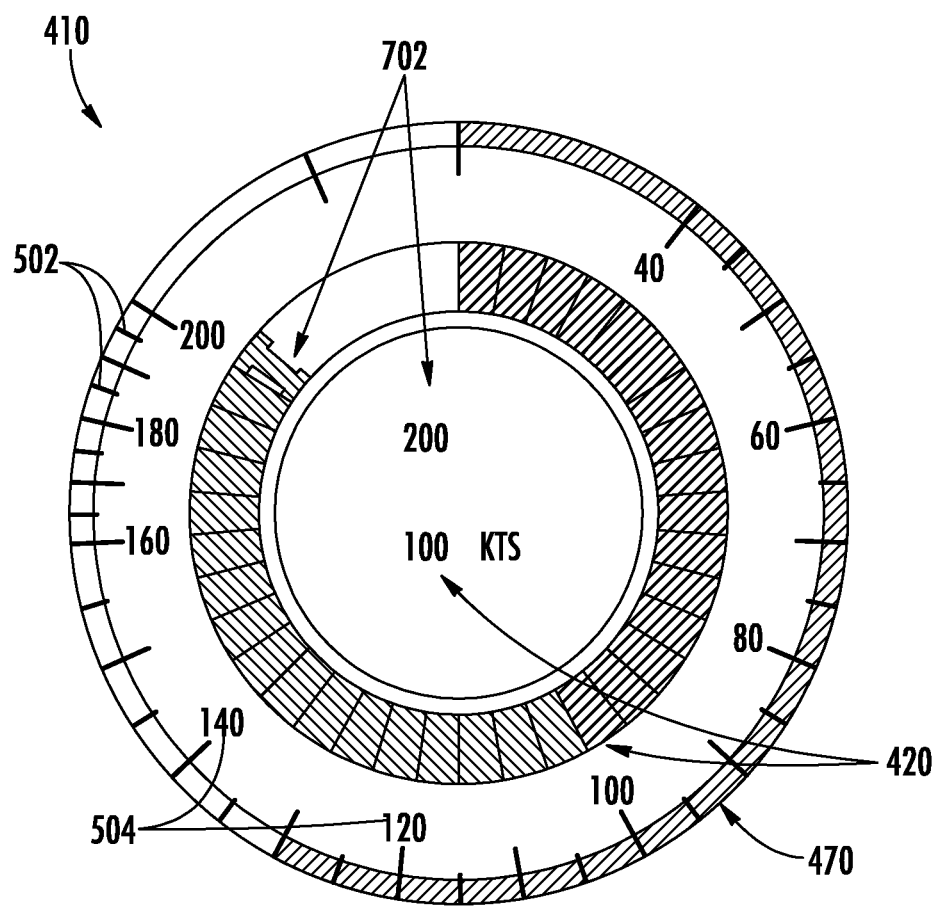
FIG. 7 depicts an example of airspeed instrument display with shared control between autonomy and user in accordance with an embodiment.

To illustrate a portion of the adaptive flight display 500 on display device 75 as generated by and/or caused to be generated by the adaptable flight display unit 330, FIG. 7 depicts another example of the airspeed instrument display 410. In FIG. 7, the airspeed instrument display 410 illustrates a commanded airspeed 702 of 200 knots by the human pilot along with the current airspeed 420 of 100 knots by the autonomous flight system 80. The commanded airspeed 702 reflects the setting for the airspeed controlled by the human pilot on user controls 90 even before the current airspeed 420 reaches the value of 200 knots, and while the autonomous flight system 80 continues controlling other aspects of the flight such as maintaining the course along the flight path 402, controlling banking, controlling altitude, etc. FIG. 7 also illustrates the airspeed range 470 in which autonomy of autonomous flight system 80 is permitted to control the airspeed of the aircraft during a given flight. The airspeed range 470 provides transparency to the human pilot of how the autonomy can operate.

Figure 6:
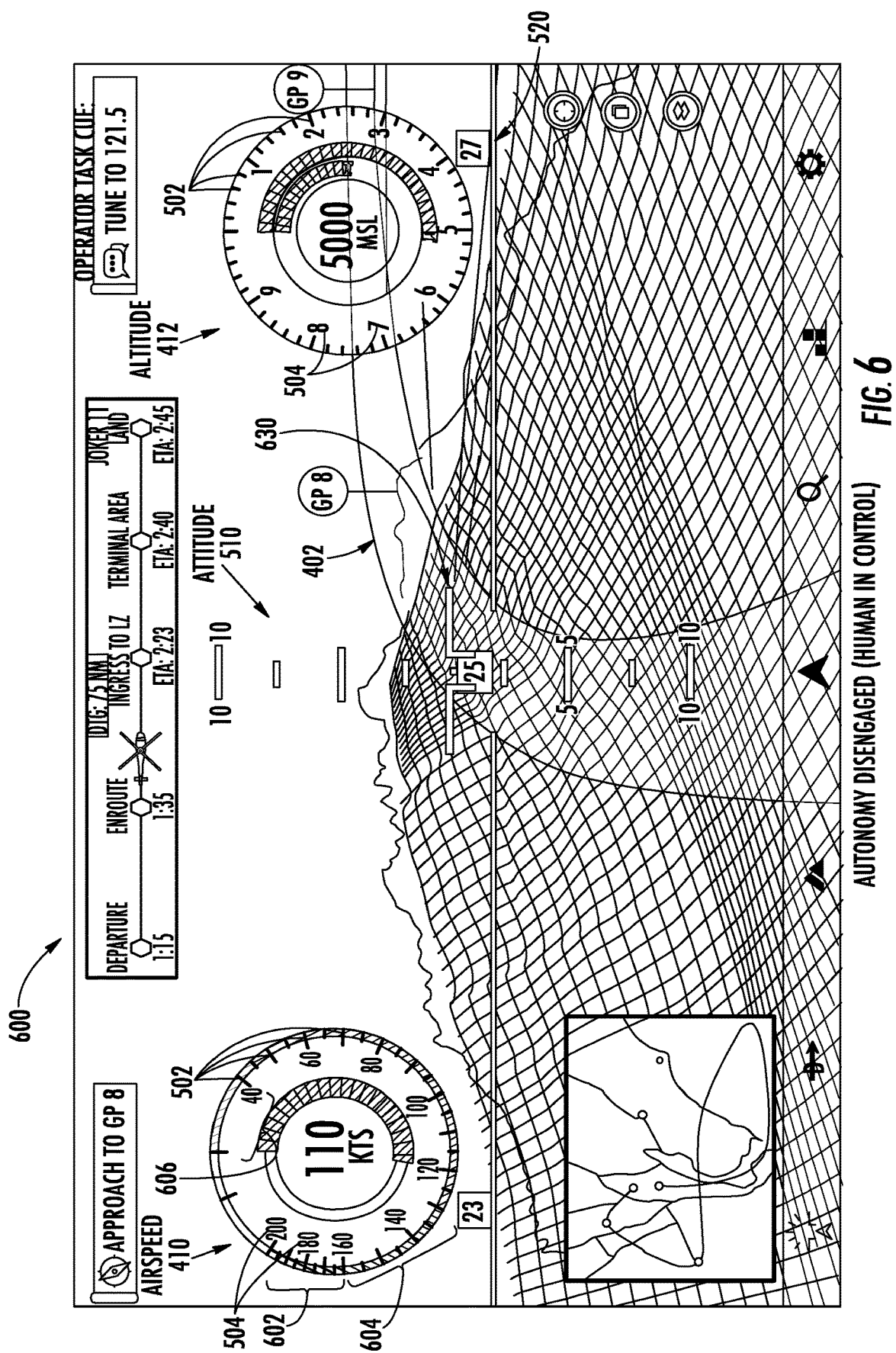
FIG. 6 depicts an example adaptive flight display with autonomy disengaged in accordance with an embodiment.

As a continued transition, FIG. 6 depicts example adaptive flight display 600 on display device 75 as generated by and/or caused to be generated by the adaptable flight display unit 330 according to embodiments. FIG. 6 provides an example of airspeed and altitude dials for manual flight when the autonomy is disengaged. In the adaptable flight display 600, the dials for the airspeed instrument display 410 and altitude dial in altitude instrument display 412 automatically revert back to information needed in manual flight. This manual information can include never exceed speed (VNE) 602, caution zone/range 604, stall speed 606, etc. For adaptive flight display 600, the adaptable flight display unit 330 is configured to remove the maximum speed indicator 450 and maximum altitude indicator 452 for manual flight by the human pilot because autonomy of the autonomous flight system 80 is disengaged. In FIG. 6, the horizon line 520 and heading indications are extended. Particularly, more horizon line is shown and more heading information/digits are provided. Additionally, iron wings 630 can change color to, e.g., from blue to white in order to visually indicate human control. In some examples, the iron wings 630 can change from one pattern to a different pattern to visually indicate human control.

As can be seen, the adaptable flight display unit 330 is configured to transition back and forth among different displays of flight information. For example, adaptable flight display unit 330 is configured to transition from adaptive flight display 400 for autonomous operations while the autonomous flight system 80 controls the aircraft 10 to the adaptive flight display 500 for shared control between the autonomous flight system 80 and the human pilot (user) using user controls 90 (and vice versa), and then transition from adaptive flight display 500 to the adaptable flight display 600 for manual flight by the human pilot using controls 90 with the autonomous flight system 80 disengaged. In another case, the adaptable flight display unit 330 is configured to transition from the adaptive flight display 500 for shared control back to adaptive flight display 400 for autonomous operations because there is no longer a need for human intervention.

As noted above, the software application 312 is configured to generate and/or cause the generation of a flight instrument PFD needed for manual control of the aircraft 10 by a human pilot (such as switching from adaptive flight display 400 to adaptive flight display 500) based on determining that human intervention is presently needed and/or that human intervention will be needed. There are various techniques for the software application 312 of adaptable flight display unit 330 to decide when to switch from displaying from adaptive flight display 400 to adaptive flight display 500. In some examples, the adaptable flight display unit 330 can have various triggers 314 which are utilized to determine that a transition from adaptive flight display 400 to adaptive flight display 500 is needed on display device 75. The triggers 314 can be rules/requirements, and the software application 312 is configured to check when the rules/requirements are met. Upon the trigger 314 (or its rule/requirement) being met, the software application 312 generates and/or causes the generation of a switch from adaptive flight display 400 to adaptive flight display 500. When known in advance by the software application 312, the software application 312 switches from display of adaptive flight display 400 to adaptive flight display 500 at a predefined time in advance of the need for the human pilot to engage the user controls 90. For example, the software application 312 can determine and/or receive an instruction from autonomous flight system 80 that the flight path 402 is approaching a mission tactical zone, and this determination and/or the instruction acts as a trigger 314 to switch from adaptive flight display 400 to adaptive flight display 500.

In accordance with embodiments, the adaptable flight display unit 330 for autonomous flight operations is provided such that the flight display will change its appearance and content presentation based on some external stimuli or information regarding the pilots behavior. First, it is envisioned that the adaptative flight display unit 330 is configured to use the pilot mental state metrics such as reported workload and cockpit engagement measures to ascertain how overloaded and/or engaged the pilot may be. For example, if the pilots hands are resting on or near the flight grip(s) or manipulating the flight grips (e.g., user controls 90), it can be inferred that the pilot is manually controlling the aircraft and therefore needs different information content presented to do that (thus the flight display/system recognizes this as a new state and adapts and presents this information). Second, the assessment of workload can be supported and therefore inferred, through physiological measurements such as heart rate, blink rate, respiration rate, and electroencephalogram (EEG) (using one or more sensors 352 coupled to computer system 350). The adaptive flight display unit 330 dynamically changes based on these reported measures. For example, if it is detected that the pilot's vitals indicate he/she is in a calm resting state with their hands off the controls, the adaptable flight display unit 330 can infer that the pilot is not trying to manipulate the aircraft and therefore does not need traditional, raw primary pilot information and thus the adaptive flight display unit 330 reverts back to the autonomous primary flight display.

The decision of presenting cockpit information can be based on an adaptation module 354. The adaption module 354 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. The adaption module 354 can be a combination of hardware and programming. The programming can be processor executable instructions stored on a tangible memory, and the hardware can include processing circuitry for executing those instructions. Alternatively or additionally, the adaption module 354 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. The adaptation module 354 is configured to dynamically change the flight display(s) based on the assessed workload and pilot/operator engagement in the context of the flight regime, thus providing context dependent aiding to the pilot. Factors that can be utilized in the adaptation module 354 to make the determination to dynamically change the adaptive PFD state may include any one or combination of the following.

1) Workload. A reported workload can be self-assessed in the cockpit. For example, the human pilot can enter a workload rating on a scale of 1 to 5 on the computer system 350, for example, at various intervals in the flight. Also, the workload can be physiological measured workload such as, for example, heart rate eye gaze, muscle tension, etc., measured using one or more sensors 352.

2) Aircraft regime/context. The aircraft regime/context checks whether the aircraft is in a state or mode in which the autonomy has low "expertise". In other words, does the human operator have more expertise or experience in this flight regime or mode? When flying into unpaved landing zones, the adaptation module 354 is configured to determine that the pilot may need to take over at any given time, thus the traditional PFD with more information would be displayed and readily available to support pilotage task (pilot hands on versus autonomy).

3) Trust in the autonomy. For hand proximity/location to flight grip(s), if hands are on grips even though autonomy is in control/flying, the adaptation module 354 can ascertain that human pilot does not trust the autonomy and therefore adapts its content/PFD to support hands on/manual control/inputs. Also, for operator disengagement, anytime the operator disengages the autonomy system, the adaptation module 354 is configured to cause the display to revert back to the original PFD to support traditional flight.

FIG. 8 depicts a flow chart 800 of a method for adaptive flight display on display screen 75 by the adaptable flight display unit 330 according to an embodiment. At block 802, the adaptable flight display unit 330 is configured to render a first flight instrument display (e.g., adaptive flight display 400) during autonomous flight operation (e.g., by autonomous flight system 80) of an aircraft 10, where the first flight instrument display comprises autonomous mode information. The application 312 coupled to processor 316 includes computer-executable instructions which are executed by the processor 316 to render images as displays on display device 75. Example autonomous mode information is displayed in, for example, airspeed dial 410 and altitude dial 412 in adaptive flight display 400 of FIG. 4

At block 804, the adaptable flight display unit 330 is configured to monitor the autonomous flight operation for a trigger (e.g., triggers 314). For example, application 312 coupled to processor 316 can monitor autonomous flight system 80 and/or user controls 90. The application 312 receives instructions/indications from the autonomous flight system 80 and/or user controls 90, which correspond/match requirements for triggers 314. In some examples, receipt of instructions/indications from the autonomous flight system 80 and/or user controls 90 acts as a trigger 314 and/or is determined to be a trigger 314 by the adaptable flight display unit 330.

At block 806, the adaptable flight display unit 330 via application 312 coupled to processor 316 determines that at least one of the triggers 314 is met to transition from the first flight instrument display (e.g., adaptive flight display 400) for the autonomous flight operation (e.g., by autonomous flight system 80) to a second flight instrument display (e.g., adaptive flight display 500) for human operation using user controls 90 of the aircraft 10, where the trigger 314 is associated with a requirement for human intervention. The application 312 determines that instructions/indications received from the autonomous flight system 80 and/or user controls 90 meet and/or recognized as requirements for human intervention in the control of the aircraft 10, thereby being a trigger 314.

At block 808, in response to the trigger 314 being met, the adaptable flight display unit 330 via application 312 coupled to processor 316 is configured to render on the display device 75 the second flight instrument display (e.g., adaptive flight display 500) for the human operation of the aircraft 10, where the second flight instrument display comprises additional information. Example additional information for human operation of the aircraft 10 is displayed in, for example, airspeed dial 410 and altitude dial 412 in adaptive flight display 500 of FIG. 5 and FIG. 7, which depict shared control between the human pilot and the autonomous flight system 80.

The first flight instrument display 400 comprises autonomous mode information associated with (e.g., a human pilot) monitoring the autonomous flight operation of the aircraft 10. The autonomous mode information is insufficient and void of detailed parameters utilized (or needed) for human operation of the aircraft 10.

The second flight instrument display 500 comprises detailed parameters for the human operation of the aircraft 10 by a human pilot. The second flight instrument display 500 comprises detailed parameters and at least a portion of autonomous mode information (e.g., from first flight instrument display 400) associated with monitoring the autonomous flight operation of the aircraft 10. The second flight instrument display 500 comprises at least one parameter for the human operation of the aircraft superimposed on autonomous mode information associated with monitoring the autonomous flight operation of the aircraft 10.

The trigger 314 comprises receiving by the adaptable flight display unit 330 an indication/instruction of a condition internal to the aircraft 10. The "trigger" can also be a series of actions. For example, if it is a new pilot to the autonomous system and he/she has less trust in the system, he/she may then push more buttons in the cockpit seeking out information; this can be utilized by application 312 (or algorithm) which tries to assume pilot intent. In this case, he/she needs more information, and thus, the application 312 responds by changing the flight display to provide more insight to facilitate trust in the autonomous system. The trigger 314 comprises receiving by the adaptable flight display unit 330 an indication/instruction of a condition external to the aircraft 10. The trigger 314 comprises receiving by the adaptable flight display unit 330 an indication/instruction that a portion of a flight path 402 is approaching which requires the human intervention. The trigger 314 comprises receiving by the adaptable flight display unit 330 an indication/instruction that at least one user control has been adjusted. As one example, the user control could be touched, and/or the user has touched a control but not made an input yet. In some examples, triggers for the adaptive display could be based on a verbal query (e.g., user/human pilot may ask "what's happening with the airspeed trend?") received by the sensor 352. In communication with the sensor 352, the application 312 can be received and processed by the application as a speech input/query.

Although examples have been provided for transitioning from adaptive flight display 400 for the autonomous flight operation (e.g., by autonomous flight system 80) to adaptive flight display 500 and/or adaptive flight display 600, it should be appreciated the adaptable flight display unit 330 is configured to transition in the reverse direction. For example, the human pilot can be manually flying the aircraft 10, and then decides to initiate the autonomous flight system 80. Accordingly, the adaptable flight display unit 330 does not cause the display screen 75 to immediately switch from adaptive flight display 600 to adaptive flight display 400 for the autonomous flight operation, but rather there is a gradual transition from adaptive flight display 600, to adaptive flight display 500, and then to adaptive flight display 400.

Figure 9:
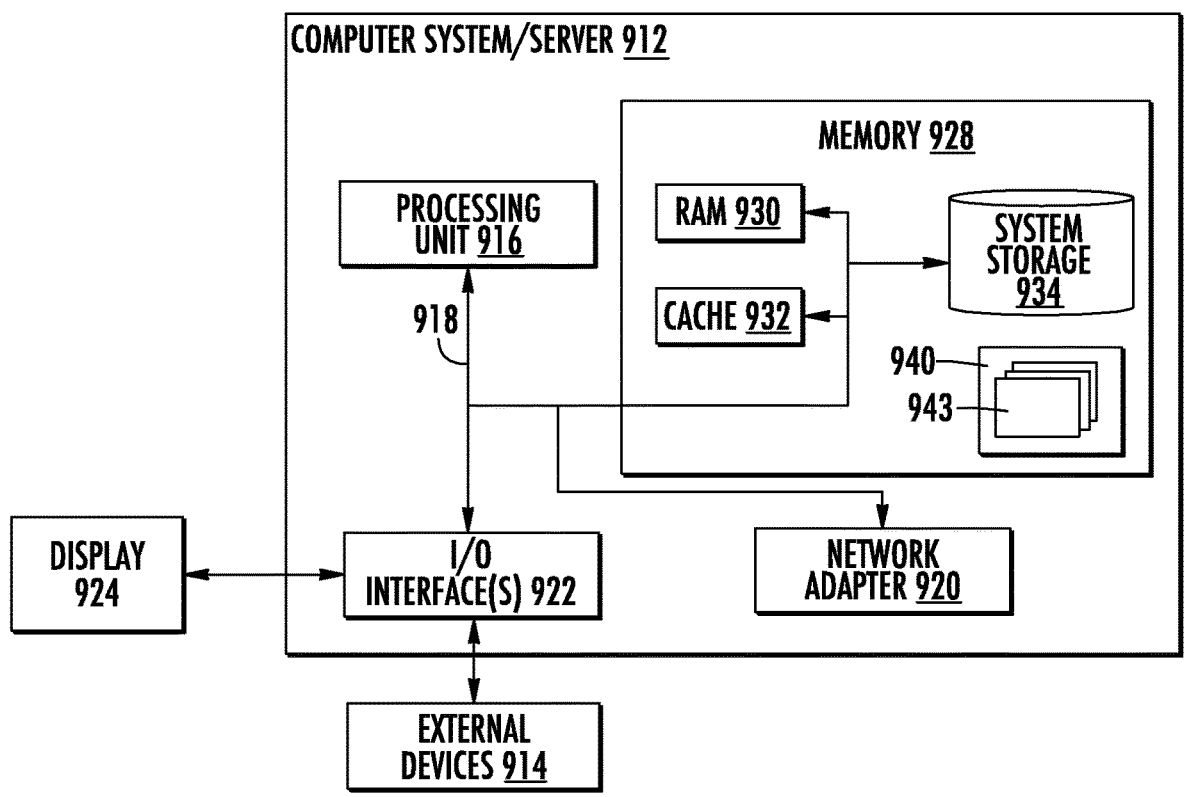
FIG. 9 depicts a schematic of an example computing system having functions and features utilized in accordance with embodiments.

FIG. 9 depicts a schematic of an example computing system 912 having functions and features utilized according to embodiments. The computer system 912 can be operational with numerous other general purpose or special purpose computing system environments or configurations. The computer system 912 can be representative of various types of computer systems on which operations and functions can run in the aircraft 10. The functions and capabilities of computing system 912 can be utilized in FIGS. 1-8 to implement one or more features of the control system 50 including flight control computer 54, autonomous flight system 80, adaptable flight display unit 330, computer system 350, etc., according to embodiments.

Computer system 912 may be described in the general context of computer system-executable instructions, such as program modules, being executed by a computer system. Generally, program modules may include routines, programs, objects, components, logic, data structures, and so on that perform particular tasks or implement particular abstract data types. Computer system 912 may be practiced in distributed cloud computing environments where tasks are performed by remote processing devices that are linked through a communications network. In a distributed cloud computing environment, program modules may be located in both local and remote computer system storage media including memory storage devices.

The components of computer system 912 may include, but are not limited to, one or more processors or processing units 916, a system memory 928, and a bus 918 that couples various system components including system memory 928 to processor 916. Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 912 typically includes a variety of computer system readable media. Such media may be any available media that is accessible by computer system 912, and it includes both volatile and non-volatile media, removable and non-removable media. The system memory 928 can include computer system readable media in the form of volatile memory, such as random access memory (RAM) 930 and/or cache memory 932. Computer system 912 may further include other removable/non-removable, volatile/non-volatile computer system storage media. By way of example only, storage system 934 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. Memory 928 may include at least one program product having a set (e.g., at least one) of program modules that are configured to carry out the functions of embodiments.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments as described herein.

Computer system 912 may also communicate with one or more external devices 914 such as a keyboard, a pointing device, a display 924, etc.; one or more devices that enable a user to interact with computer system 912; and/or any devices (e.g., network card, modem, etc.) that enable computer system 912 to communicate with one or more other computing devices. Such communication can occur via Input/Output (I/O) interfaces 922. Still yet, computer system 912 can communicate with one or more networks such as a local area network (LAN), a general wide area network (WAN), and/or a public network (e.g., the Internet) via network adapter 920. As depicted, network adapter 920 communicates with the other components of computer system 912 via bus 918. It should be understood that although not shown, other hardware and/or software components could be used in conjunction with computer system 912.

Examples, include but are not limited to: microcode, device drivers, redundant processing units, external disk drive arrays, RAID systems, tape drives, and data archival storage systems, etc.

Embodiments may be a system, a method, and/or a computer program product at any possible technical detail level of integration. The computer program product may include a computer readable storage medium (or media) having computer readable program instructions thereon for causing a processor to carry out embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform embodiments.

Embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. By way of example, aspects of the invention can be used in other forms of aircraft, including coaxial aircraft, tilt rotor aircraft and fixed wing aircraft. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for adaptive flight display, the method comprising:
    rendering a first flight instrument display during autonomous flight operation of an aircraft, the first flight instrument display comprising autonomous mode information;
    determining, by a processor, that a trigger is met to transition from the first flight instrument display for the autonomous flight operation to a second flight instrument display for providing an increased perception of aircraft operating parameters for at least one of increased human awareness and human operation of the aircraft, the trigger being associated with a requirement for human intervention; and
    in response to the trigger being met, rendering the second flight instrument display for the human operation of the aircraft, the second flight instrument display comprising additional information.

2. The method of claim 1, wherein the autonomous mode information is associated with monitoring the autonomous flight operation of the aircraft.

3. The method of claim 1, wherein the autonomous mode information is void of detailed parameters utilized for the human operation of the aircraft.

4. The method of claim 1, wherein the additional information comprises detailed parameters for the human operation of the aircraft.

5. The method of claim 4, wherein the second flight instrument display comprises the detailed parameters and at least a portion of the autonomous mode information associated with monitoring the autonomous flight operation of the aircraft.

6. The method of claim 1, wherein the second flight instrument display comprises at least one parameter for the human operation of the aircraft superimposed on the autonomous mode information associated with monitoring the autonomous flight operation of the aircraft.

7. The method of claim 1, wherein the trigger comprises receiving an indication of a condition internal to the aircraft.

8. The method of claim 1, wherein the trigger comprises receiving an indication of a condition external to the aircraft.

9. The method of claim 1, wherein the trigger comprises receiving an indication that a portion of a flight path is approaching which requires the human intervention.

10. The method of claim 1, wherein the trigger comprises receiving an indication that at least one user control has been adjusted.

11. A system for adaptive flight display, the system comprising:
    a processor; and
    memory coupled to the processor and comprising computer-executable instructions that, when executed by the processor, cause the processor to perform operations comprising:
    rendering a first flight instrument display during autonomous flight operation of an aircraft, the first flight instrument display comprising autonomous mode information;
    determining, by the processor, that a trigger is met to transition from the first flight instrument display for the autonomous flight operation to a second flight instrument display for providing an increased perception of aircraft operating parameters for at least one of increased human awareness and human operation of the aircraft, the trigger being associated with a requirement for human intervention; and
    in response to the trigger being met, rendering the second flight instrument display for the human operation of the aircraft, the second flight instrument display comprising additional information.

12. The system of claim 11, wherein the autonomous mode information is associated with monitoring the autonomous flight operation of the aircraft.

13. The system of claim 11, wherein the autonomous mode information is void of detailed parameters utilized for the human operation of the aircraft.

14. The system of claim 11, wherein the additional information comprises detailed parameters for the human operation of the aircraft.

15. The system of claim 14, wherein the second flight instrument display comprises the detailed parameters and at least a portion of the autonomous mode information associated with monitoring the autonomous flight operation of the aircraft.

16. The system of claim 11, wherein the second flight instrument display comprises at least one parameter for the human operation of the aircraft superimposed on the autonomous mode information associated with monitoring the autonomous flight operation of the aircraft.

17. The system of claim 11, wherein the trigger comprises receiving an indication of a condition internal to the aircraft.

18. The system of claim 11, wherein the trigger comprises receiving an indication of a condition external to the aircraft.

19. The system of claim 11, wherein the trigger comprises receiving an indication that a portion of a flight path is approaching which requires the human intervention.

20. The system of claim 11, wherein the trigger comprises receiving an indication that at least one user control has been adjusted.

* * * * *